United States Patent [19]

Umeda et al.

[11] 4,362,771
[45] Dec. 7, 1982

[54] LIQUID CRYSTAL DISPLAY ELEMENT WITH GAP CONTROLLING MATERIAL AND PROCESS FOR PRODUCTION THEREOF

[75] Inventors: Takao Umeda, Hitachi; Tatsuo Igawa, Kitaibaraki; Yuzuru Simazaki, Hitachi; Takao Miyashita, Mito; Fumio Nakano, Hitachi, all of Japan

[73] Assignee: Hitachi, Ltd., Tokyo, Japan

[21] Appl. No.: 311,971

[22] Filed: Oct. 16, 1981

[30] Foreign Application Priority Data

Oct. 20, 1980 [JP] Japan .................. 55-145809

[51] Int. Cl.³ ............................................. C09K 3/34
[52] U.S. Cl. ....................................... 428/1; 156/306.6
[58] Field of Search ............. 428/1, 220, 215, 325, 428/327; 156/306.6; 350/160 LC

[56] References Cited

U.S. PATENT DOCUMENTS 4,242,388 12/1980 Kaufmann ....................... 428/1
4,297,401 10/1981 Chern ............................... 428/1

Primary Examiner—Marion McCamish
Attorney, Agent, or Firm—Antonelli, Terry & Wands

[57] ABSTRACT

This invention relates to a liquid crystal display element comprising a pair of transparent substrates, electrodes formed on the individual surfaces thereof facing each other, a liquid crystal material layer held between the substrates, and gap controlling material for keeping the gap between the substrates, and is characterized in that the gap controlling material is dispersed and fixed on the substrate surface by an insulating coating film such as an orientation controlling film.

When the gap controlling material is thus dispersed and fixed, it does not move between the substrates, and hence the change of the gap length between the substrates is prevented, so that there can be obtained a liquid crystal display element in which the distance between the substrates is uniform. Moreover, when the insulating coating film is an orientation controlling film, the dispersion and fixation of the gap controlling material is completed simultaneously with the formation of the orientation controlling film, so that beneficial effect can be obtained also with respect to working efficiency.

When the gap controlling material is a combination of a polymer solid and an insulating material having a higher softening point and regidity than those of the polymer solid, the uniformalization and change prevention of the gap length are more effectively achieved.

28 Claims, 4 Drawing Figures

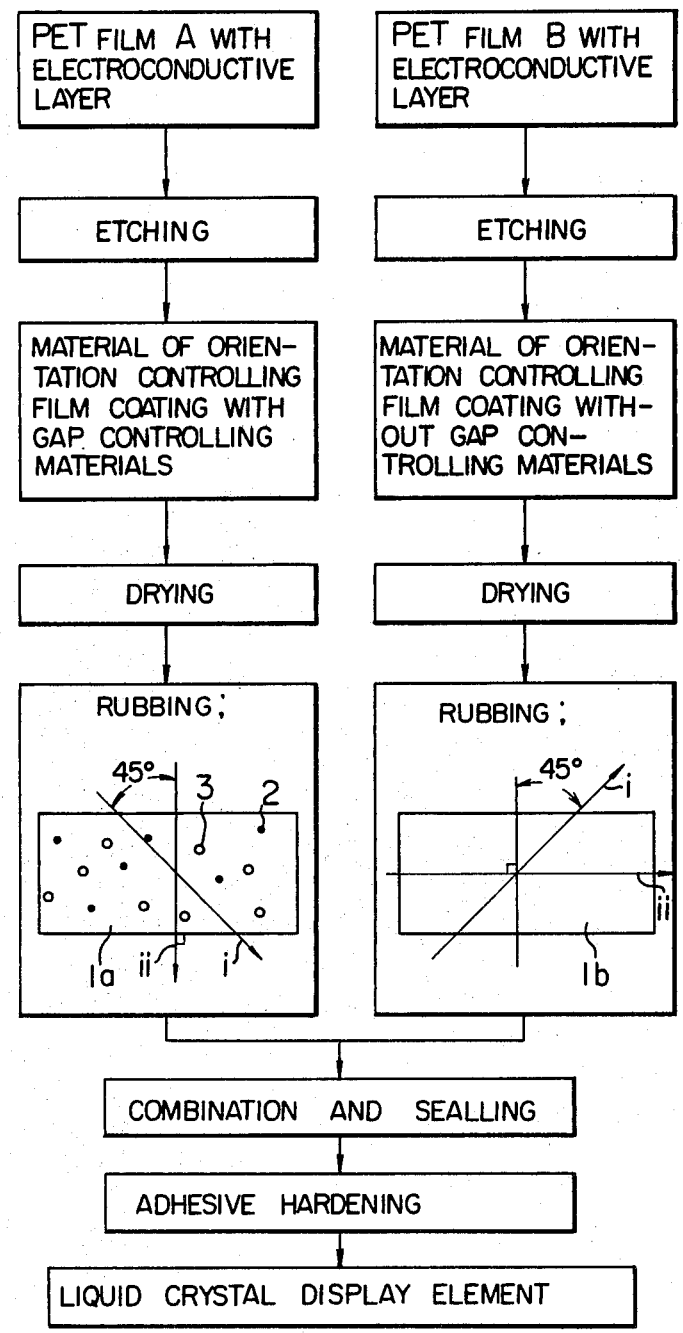

LIQUID CRYSTAL DISPLAY ELEMENT WITH GAP CONTROLLING MATERIAL AND PROCESS FOR PRODUCTION THEREOF

BACKGROUND OF THE INVENTION

This invention relates to a liquid crystal display element and a process for production thereof, particularly to a liquid crystal display element capable of keeping a uniform gap all over the display areas of the element, for example, in the case of an element using a very thin flexible substrate such as a plastics film and an element whose substrate is a rigid body such as a glass plate and which has a large panel size, such as elements for television, character display and the like.

Liquid crystal display elements comprise a pair of transparent substrates, electrodes formed on the individual surfaces thereof facing each other, a liquid crystal material layer held between the substrates, and a spacer (a gap controlling material) for keeping the gap between the substrates. The substrates are adhered to each other at the periphery with a sealant. The gap between the substrates is controlled by incorporating a spacer material such as glass, beads, glass fiber or the like into the sealant. When the substrate becomes thin or large, the gap at the center of the element was changed owing to deflection caused by the weight of the substrate itself or pressure from the outside.

In conventional methods, insulating granules such as glass fibers, alumina granules, titanium oxide, or the like are dispersed on the substrates. As methods for dispersing them, there are methods comprising distributing the aforesaid insulating granules by use of a dispersion medium such as an alcohol on the substrates which have been subjected to orientation treatment for orientation controlling of the liquid cyrstal molecules, thereafter constructing the substrates into an element, and then enclosing liquid crystal therein; and a method comprising incorporating a spacer material into only the peripheral sealing portion, making an element, and then enclosing therein a liquid crystal material containing insulating granules, thereby distributing the insulating granules in the element. However, according to either method, the insulating particles distributed in the element are not fixed, and hence when a pressure is applied from the outside, the insulating granules move, so that the gap of the element is changed.

SUMMARY OF THE INVENTION

An object of this invention is to provide a liquid crystal display element capable of accurately keeping the gap between the substrates facing each other and a process for production thereof.

The liquid crystal display element of this invention is characterized in that the gap controlling material is a solid which is dispersed and fixed in an insulating coating film formed on at least one of the substrates.

The process for producing a liquid crystal display element of this invention is characterized by previously dispersing a gap controlling material in a resin solution which is to be a material for the orientation controlling films, and then applying said solution to the surface of at least one of the substrates.

In this invention, the insulating film formed on the inside surface of at least one of the substrates is continuous, and the gap controlling material such as polymer solid, insulating material, or the like dispersed in the insulating coating film is fixed on the substrate surface.

BRIEF DESCRIPTION OF THE DRAWINGS

FIG. 3 is a flow diagram illustrating an example of the steps in the process for producing a liquid crystal display element of this invention.

DETAILED DESCRIPTION OF THE PREFERRED EMBODIMENTS

As the spacer for controlling the gap, there is used such a solid as can be dispersed and fixed in the insulating coating film, and this solid comprises two or more kinds of solids which are different in quality. Preferable examples of the solid include a combination of a polymer solid and an insulating material (solid) having a higher softening point and rigidity than does the polymer solid. The polymer solid is heated and deformed at the time of forming a gap between the substrates, and compressed to a gap determined by the size of the insulating solid.

This invention is explained below in detail referring to the attached drawings.

Figure 1:
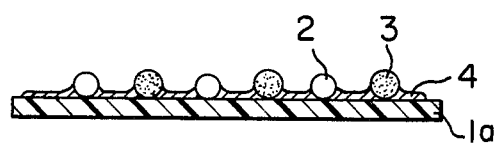
FIG. 1 is a cross-sectional view illustrating the condition of the gap controlling material dispersed and fixed in the insulating coating film on the substrate surface.

In FIG. 1, 1a shows a transparent substrate; 2 shows insulating rod-like granules; 3 shows a granular polymer solid; and 4 shows an orientation controlling film (this is included in the term "an insulating coating film") for orientation-controlling of the liquid crystal molecules. The diameter of the insulating material 2 determinds the gap between the substrates after the molding of the element, and is, for example, 10 μm. On the other hand, the polymer solid 3 is compressed at the time of forming the element, melted and adhered to both the upper and lower substrates, and prevents the substrates from separating from each other (or from swelling), and hence has a lower softening point and rigidity than does the insulating material 2. The diameter of the polymer solid 3 is, for example, 20 μm.

When these gap controlling materials are dispersed on at least one of the substrates, each of the gap controlling material should not be concentrated in one place but properly separated and dispersed from the viewpoint of the display quality after production of the element. It was confirmed from experiments that gap controlling materials could sufficiently be distributed by coating a substrate by a spin coating method with an emulsion prepared by dispersing gap controlling materials into a solvent having a specific gravity almost equal to or lower than those of the gap controlling materials to be used, and then allowing the solvent to evaporate. The dispersed amount can be controlled by the concentrations of the gap controlling materials in the solvent and the spin coating conditions (rotation rate and rotation time).

As a method for dispersing the gap controlling materials, it is most practical to previously incorporate them into a solution containing a insulating coating film material, particularly an orientation controlling film material in a solvent. In this case, the polymer solid can be dispersed simultaneously with the formation of an orientation controlling film. In this case, the gap controlling materials and the insulating coating film, for example, the orientation controlling film are fixed as one body.

Therefore, even if the orientation controlling film is rubbed as it is with buff cloth or the like, the gap controlling materials are not peeled therefrom. That is to say, when the insulating material 2 and the polymer solid 3 for adhering the upper and lower substrates to each other are previously incorporated into a solution for forming an orientation controlling film, the polymer solid and the insulating material can be distributed simultaneously with the formation of the orientation controlling film.

In elements using two substrates, it is desirable that the surface of only one substrate is coated with a solution of an orientation controlling film material which contains gap controlling materials, while the surface of the other substrate is coated with a solution of the orientation controlling film material which contains no gap controlling materials. This is because in this case, there is no fear that the gap controlling materials come across one another when the two substrates are placed face to face. However, this invention is not limited thereto. For example, gap controlling materials may be dispersed on both substrates. Further an insulating material can be dispersed and fixed on the surface of one substrate and a polymer solid on the surface of the other substrate.

When a substrate (a glass plate or a film piece) was coated, at 3,500 r.p.m. for a rotation time of 40 seconds by means of a spinner, with a solution prepared by incorporating polymer beads of polyethylene and glass fibers (obtained by cutting glass fiber having a diameter of 10 $\mu$m into 10 to 50 $\mu$m in length) into a 3% solution of DMF (dimethylformamide) belonging to polyamide series resins, the incorporated amount and the distributed amount were almost proportionate to each other. The difference between the distributed amounts of the glass fibers and the polyethylene beads is due to the difference in their specific gravity and shape. The distributed amounts shuld be determined depending upon the quality and thickness of the substrates. When the substrates are thin flexible substrates such as a plastics film, it is preferable for making the element gap uniform to make the distributed amounts larger than those adopted in the case of a glass substrate. However, when the distributed amount is increased, the proportion of the adhering portions in the display areas increases, so that the display quality is deteriorated. Therefore, the dispersed amount of the polymer solid is adjusted to 10 to 2000 granules/cm$^2$, more preferably 500 to 2000 granules/cm$^2$. On the other hand, the dispersed amount of the rod-like granules is practically 100 to 1,000 granules/cm$^2$, more preferably 200 to 1,000 granules/cm$^2$.

The maximum length of each gap controlling material should be at most 50 $\mu$m or less. Otherwise the gap controlling materials are too large and conspicuous, and hence hinder display.

Among insulating materials, like glass short fibers, synthetic high polymer short fibers and the like, the rod-like granules are suitable starting materials. When globular materials such as glass beads are substituted for the glass short fibers, the substrates are put against them at the time of forming the gap and they come in contact with the substrate surface, so that the surface substrate does not become smooth when the substrate is plastics. However, the rod-like granules come in linear contact therewith, therefore the substrate surface becomes smooth, so that a uniform gap is formed. It is important for achieving the above-mentioned purpose that the rod-like granules are aligned in parallel with the substrate surface.

It is important that at least at the time of gap formation work, the insulating materials used as the gap controlling materials have a higher softening point and rigidity than does the synthetic high polymer solid. Because otherwise the insulating material is deformed at the time of gap formation, so that no accurate gap can be obtained.

Figure 2A:
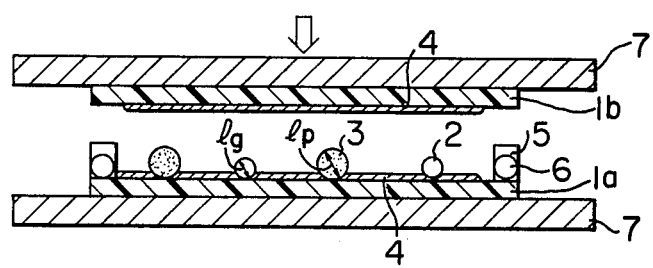
FIG. 2 is a cross-sectional view illustrating a step of placing one of the two substrates on the other.
Figure 2B:
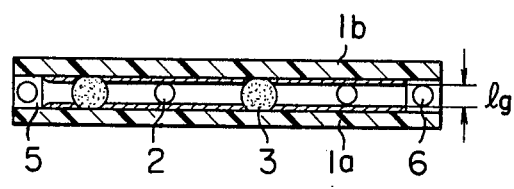

As shown in FIG. 2(a), on a transparent substrate 1a are distributed an insulating material 2 and a polymer solid 3 having a size $l_p$ a little higher than the size $l_g$ (hereinafter referred to as "spacer size") of the insulating material 2, for example, a thermoplastic polymer solid such as polyethylene beads. 5 shows a sealant applied to the transparent substrate 1a. The sealant 5 contains solid granules 6 having about the same diameter as that of the insulating material 2, namely, a size $l_g$. When both substrates are pressed while raising the temperature of a heating metallurgic instrument 7 to a temperature higher than the softening point of the polymer solid and lower than the heat resistance temperatures of the transparent substrates 1a and 1b, the polymer solid 3 is melted and crushed to the spacer size $l_g$ based on the insulating material 2. When in this condition, the temperature is made lower than the melting point of the polymer, the upper and lower substrates are adhered to each other, keeping the distance between them at $l_g$, as shown in FIG. 2(b). In this case, the adhesion areas is determined by the polymer size, and can be adjusted to several tens $\mu$m. Unlike adhesion by use of a thermosetting polymer, adhesion by use of a thermoplastic polymer is melting adhesion, therefore when it is adopted, the upper and lower substrates can be adhered to each other in a very short time (several seconds). An unhardened thermosetting polymer solid may be dispersed in the insulating coating film and then heated and hardened in place of the thermoplastic polymer. The size of the polymer solid used in this invention is preferably a little larger than the gap size (for example, 10 to 20 $\mu$m when the gap size is 10 $\mu$m).

At present, polymer beads (of globular shape) which have a particle size of several $\mu$m to several tens $\mu$m and whose particle distribution can be controlled are on the market. The kinds and characteristics of representative thermoplastic polymer beads are shown in the table.

TABLE 1

| Resin | Specific gravity | Softening point | Maximum continuous use temperature |
|---|---|---|---|
| Acrylic resin | 1.17–1.20 | — | 85° C. |
| AB (acrylonitrile-butadiene resin) | 1.09 | — | 93° C. |
| Polystyrene | 1.04–1.07 | 230 | 78° C. |
| Nylon | 1.09–1.14 | 180 | 149° C. |
| Polyacetal | 1.425 | — | 91° C. |
| Polyethylene (low density) | 0.915 | 115 | 100° C. |
| Polycarbonate | 1.20 | 220–240 | 121° C. |
| Polyvinylidene chloride | 1.65–1.72 | 185–200 | 93° C. |
| Acetate resin | 1.23–1.34 | 220 | 95° C. |

When the substrate is a glass plate, all the polymer beads listed in the table can be used because the substrate withstands a high temperature of about 350° C. On the other hand, films of polyethylene terephthalate (PET) and polycarbonate have an allowable temperature at the time of processing of at most 150° C., and hence when any of these films is used as an element substrate, resins which can be used as the polymer are polyethylene, nylon and the like. These polymers are excellent in solvent resistance and hence suffer from no problems such as peeling-off in the adhering portions and stains which are caused by the liquid crystal material.

As the polymer solid, there are, besides polymer beads, finely cut polymer fibers such as acetate fibers, nylon fibers, acryl fibers, vinylidene fibers, vinyl chloride fibers, polyester fibers, polyethylene fibers, polypropylene fibers, and the like.

As the polymer solid, solids made from a thermosetting resin such as epoxy resin, phenol resin, melamine resin, and the like are also effective in addition to the above-mentioned solids made from a thermoplastic resin.

The polymer solid is heated at the time of formation of a gap between the substrates, pressed to be deformed and condensed to a gap length which is determined by the size of the insulating material. The polymer solid is thus melted and adhered so as to come in surface contact with the individual surfaces of the upper and lower substrates. Therefore there is no fear that the upper and lower substrates swell, and the polymer solid itself is firmly fixed between the substrates. On the other hand, the insulating material is not deformed by heating or pressing. Accordingly, the gap length between the substrates becomes almost uniform at all the positions between the substrates. Furthermore, since both gap-controlling materials are at the fixed position owing to the insulating coating film, the gap controlling material does not move after formation of the element. Therefore, the gap length between the substrates is kept with good accuracy.

This invention is explained above referring to examples in which two kinds of gap controlling materials are used, though the gist of this invention is to disperse and fix a gap controlling material on the substrate surfaces by an insulating coating film, and the gap controlling material may be of one kind or many kinds. However, the gap controlling materials should contain a solid having a certain rigidity for keeping the gap length.

When at least one of the transparent substrates is a flexible thin plate, it is heated and dried preferably at low temperatures after coated with a solution of an orientation controlling film material. In this case, polyamide series resins are most preferable as said orientation controlling film material. For applying a polyamide resin, a 2-3% by weight solution of the resin in cyclohexane as a solvent is suitable. When this resin solution is used, a good orientation controlling film can be obtained by heating the resulting coating at 100° C. or lower for 30 minutes at the time of drying.

When both transparent substrates are glass plates, the orientation controlling film need not be formed at low temperatures as in the case of the aforesaid flexible thin plate. For example, when the refractive index and the prevention of the electrodes from being visible are taken into consideration, an orientation controlling film from a copolymer of a dibasic acid hydrazide compound, a diamine compound and tetracarboxylic acid dianhydride is most suitable. Polyimide series resins such as polyimideisoindroquinazolinedione and the like are also effective. For applying the former resin, a 7% by weight solution thereof in N-methyl-2-pyrrolidone is suitable, and for applying the latter resins, a 2-3% by weight solution thereof in N-methyl-2-pyrrolidone is suitable. When these resin solutions are used, the heating conditions after drying of 250° C. and 2 hrs. are criterions for obtaining a good orientation controlling film.

As the sealant, a solution prepared by incorporating a solid for spacer into a polyester series adhesive or an epoxy series adhesive is suitable when a flexible thin plate is used as the substrate. For sealing the periphery of the space between glass substrates, a solution prepared by incorporating a solid for spacer into an epoxy series resin is suitable.

The transparent substrates may be either a homogeneous material or a laminate plate.

In FIG. 3 is illustrated the production process of a liquid crystal display element in which polyethylene terephthalate films (hereinafter referred to as "PET film") of 100 μm in thickness are used as substrates.

First, etching treatment is given to each of a pair of PET films with a transparent electroconductive layer which are to be the upper and lower substrate of the liquid crystal display element, whereby electrodes are formed to the predetermined pattern. A pair of PET films with a transparent electrode are thus obtained. During the treatment, washing and drying are properly conducted.

Next, the individual electrode sides of the PET films are coated with an orientation controlling film material. One of the surfaces, i.e., PET film A is coated by means of a spinner with a solution of an orientation controlling film material which contains gap controlling materials. The operation conditions of the spinner are 3,500 r.p.m. for 40 seconds. The orientation controlling film material is a solution prepared by incorporating 0.3% by weight of low-density polyethylene beads having a particle size of 15 to 20 μm and 0.1% by weight of glass fiber having a diameter of 10 μm and a length of 10 to 50 μm into a 3% DMF solution of a polyamide series resin.

After coating, the film is dried at 80° C. for 1 hour. Thereafter, it is subjected to rubbing treatment with buff cloth in the direction of the arrow in (i) so that the twist angle may be 90°.

The other surface, i.e., PET film B is coated by means of a spinner with a solution of an orientation controlling film material which contains no gap controlling materials. This orientation controlling film material is a 3% DMF solution of a polyamide series resin. After the coating, the film is dried under the same conditions as in the case of PET film A, and then rubbed in the direction of the arrow in (ii). In the rubbing steps in FIG. 3, the arrow (i) shows one example of rubbing direction in the case of forming an element for table computers and the rubbing angle may be 40°. In the case of forming an element for wrist watches, the rubbing direction shown by the arrow (ii) is preferable.

Next, the periphery of PET film A is coated with a sealant, an epoxy series adhesive containing glass fibers having a diameter of 10 μm and a length of 10 to 50 μm, after which PET film B is placed on PET film A, and the resulting assembly is set between a pressing metallurgic instrument 7 and pressed. According to researches by the present inventors, the gap length decreases as the molding pressure increases. When the molding pressure is $25.5 \times 10^3$ N/m$^2$, the gap length ranges from 9 μm to 13.5 μm, and is scarcely dependent upon the dispersed amount of the polyethylene beads. When the molding pressure exceeds $42.5 \times 10^3$ N/m$^2$, the gap length is dependent also upon the dispersed amount of the polyethylene beads, and as the dispersed amount increases, the gap length decreases, i.e., it becomes equal to the diameter lg of the glass fibers. When the press step is carried out at a molding pressure of $42.5 \times 10^3$ N/m$^2$, the polyethylene beads are melted in about 30 seconds and adhere to the individual surfaces of the upper and lower substrates.

Subsequently, the assembly is left, as it is pressed, in a temperature atmosphere at 80° C. for 30 minutes to harden the peripheral sealant. Thereafter, a cyclohexane series liquid crystal composition is poured from the opening for enclosing provided on the sealed portion, and after completion of the enclosing, the opening for enclosing is sealed.

The element was lighted and the display condition was observed to find that the presence of the glass fiber and the polymer beads were imperceptible. The reason of this result is thought to be that the refractive indexes of the glass fibers and the polyethylene beads are 1.5 to 1.6, which is about the same as that of the liquid crystal of 1.5 to 1.65 and that of the PET films of 1.65.

Next, an element produced by way of trail was set in a thermostat at 70° C. and the lighted condition was observed to find that phenomena such as the occurence of color uneveness, the increase of the working threshold voltage, and the like were not observed. Since the melting point of polyethylene is 115° C., the films were not peeled from each other in the adhering portions even at 85° C.

In the manner described above, there can be produced an element in which the distance between the PET films is a uniform gap length (10±1 μm). The gap controlling materials distributed in the liquid crystal display element are fixed at least by the orientation controlling film and hence do not move even if a pressure is applied from the outside, therefore the gap length is not changed. Moreover, coating with an orientation controlling film material and dispersion of gap controlling materials can be conducted at the same time, so that the production process mentioned above is excellent also in working efficiency.

Further, according to the production process in this example, the polyethylene beads have two important functions. One of them is as follows: When the pressure applied by the heating metallurgic instrument 7 is removed after completion of molding of the element, the PET films will retun to the state before molding, and the adhesion of the polyethylene beads functions so as to abate their restoring force. Although the adhesion between the polyethylene beads and the PET films is thought to be weak, the restoring force of the PET films is expected to be sufficiently weak. As the other function, there is thought such a function that the polyethylene beads are excellent as supports for the PET films because the contact between the polyethylene beads and the PET film is surface contact. As to the glass fibers, they are in linear contact with the PET films, does not stick in the PET films and has many contacting parts, therefore it is excellent as supports, and this is thought to do a major service to uniformalizating the gap length.

What is claimed is:

1. In a liquid crystal display element comprising a pair of transparent substrates, electrodes formed on the individual surfaces thereof facing each other, a liquid crystal material layer held between the substrates, and a gap controlling material for keeping the gap between said substrates, the improvement wherein said gap controlling material is a solid dispersed and fixed in an insulating coating film formed on at least one of said substrate surfaces.

2. A liquid crystal display element according to claim 1, wherein said gap controlling material comprises two or more kinds of solids differing in quality from each other.

3. A liquid crystal display element according to claim 2, wherein said gap controlling material comprises a polymer solid and an insulating material having a higher softening point and rigidity than those of the polymer solid.

4. A liquid crystal display element according to claim 1, wherein said gap controlling material contains rod-like granules having about the same diameter which are aligned in parallel with said substrate surfaces.

5. A liquid crystal display element according to claim 3, wherein said insulating material is rod-like granules having about the same diameter which are aligned in parallel with said substrate surfaces.

6. A liquid crystal display element according to claim 4 or 5, wherein said rod-like granules are cut glass short fibers.

7. A liquid crystal display element according to claim 6, wherein said glass short fibers are dispersed in density of 200 fibers or more per cm$^2$ of said insulating coating film.

8. A liquid crystal display element according to claim 1, wherein said insulating coating film is an orientation controlling film which conducts orientation-controlling of the liquid crystal molecules.

9. A liquid crystal display element according to claim 1, wherein said gap controlling material contains a polymer solid.

10. A liquid crystal display element according to claim 3 or 9, wherein said polymer solid is a thermoplastic resin or a thermosetting resin.

11. A liquid crystal display element according to claim 3 or 9, wherein said polymer solid is in surface contact with said substrates and is dispersed in density of 10 to 2,000 solid granules per cm$^2$ of said insulating coating film.

12. A liquid crystal display element according to claim 11, wherein the dispersed amount of said polymer solid is 500 particles/cm$^2$ or more.

13. A liquid crystal display element according to claim 1, wherein said gap controlling material has a maximum length of 50 μm or shorter per granule.

14. A liquid crystal display element according to claim 1, wherein the gap controlling materials are combined so that the refractive indexes of said polymer solid and said insulating material may be the same as that of said liquid crystal material.

15. In a liquid crystal display element comprising a pair of transparent substrates at least one of which is a flexible thin plate, electrodes formed on the individual surfaces thereof facing each other, a liquid crystal material layer held between the substrates, and a gap controlling material for keeping the gap between said substrates, the improvement wherein said gap controlling material contains a polymer solid and an insulating material having a higher softening point and rigidity than does the polymer solid and is dispersed and fixed in an insulating coating film formed on the surface of at least one of the substrates.

16. A liquid crystal display element according to claim 15, wherein said insulating coating film is made of a polyamide resin.

17. A liquid crystal display element according to claim 15, wherein said polymer solid is polyethylene and/or nylon.

18. A liquid crystal display element according to claim 15, wherein said insulating material is glass short fibers.

19. A liquid crystal display element according to claim 15, wherein said polymer solid is in surface contact with each of the substrates, and said insulating material is in linear contact with each of the substrates.

20. In a process for producing a liquid crystal display element comprising a step of coating individual surfaces of electrodes formed on individual transparent substrates with a resin solution of a raw material for forming an orientation controlling film; a step of drying the resulting coatings to form a resin film on individual substrates; a step of rubbing individual resin films to give orientation controlling films; a step of piling a plurality of the thus treated substrates one after another so as to make individual electrode forming surfaces face each other; a step of sealing each periphery of spaces between the substrates immediately after or simultaneously the step of piling the substrates; and a step of enclosing a liquid crystal material in each sealed space between the substrates followed by sealing the opening, the improvement which comprises coating the resin solution dispersing a gap controlling material therein on at least one of the substrates.

21. A process according to claim 20, wherein a resin solution containing a polyamide resin and cyclohexane as a solvent is coated on an electrode formed surface at least one substrate and a resin solution containing a polyamide resin, a solvent and a gap controlling material dispersed therein is coated on electrode formed surface of another substrate facing to the above-mentioned electrode formed surface.

22. A process according to claim 20, wherein a resin solution containing a polyimide resin and N-methylpyrrolydone as a solvent is coated on an electrode formed surface of at least one substrate and a resin solution containing a polyimide resin, a solvent and a gap controlling material dispersed therein is coated on an electrode formed surface of another substrate facing to the above-mentioned electrode formed surface.

23. A process according to claim 20, 21 or 22, wherein the gap controlling material comprises a polymer solid and a insulating material having a higher softening point and rigidity than those of the polymer solid.

24. A process according to claim 23, wherein the polymer solid is compressed so as to have the same size as that of the insulating material and is fused to a pair of substrates holding the gap controlling material therebetween.

25. A process according to claim 20, wherein the step of sealing is carried out by using a sealant containing solid particles which are dispersed therein and have almost the same size as that of the insulating material.

26. A process according to claim 25, wherein the sealant is an epoxy resin adhesive.

27. A process according to claim 25, wherein the sealant is an epoxy resin adhesive and solid particles are glass fibers.

28. A process according to claim 20, wherein a pressure of about $42.5 \times 10^3$ N/m$^2$ or more is employed for sealing after piling a plurality of substrates.

* * * * *